June 26, 1945.  S. B. HASELTINE  2,379,078
FRICTION SHOCK ABSORBER
Filed Dec. 22, 1943  2 Sheets-Sheet 1
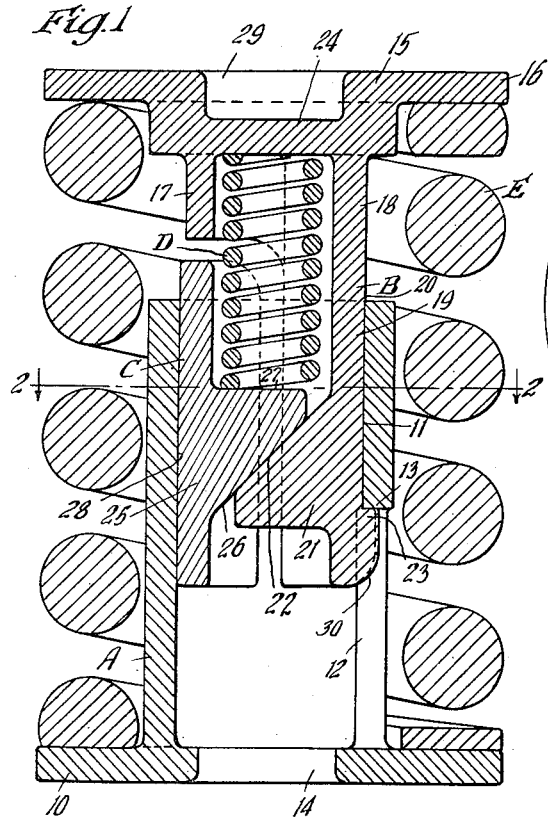
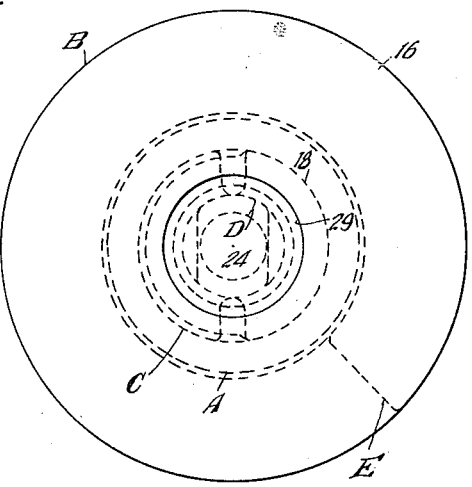
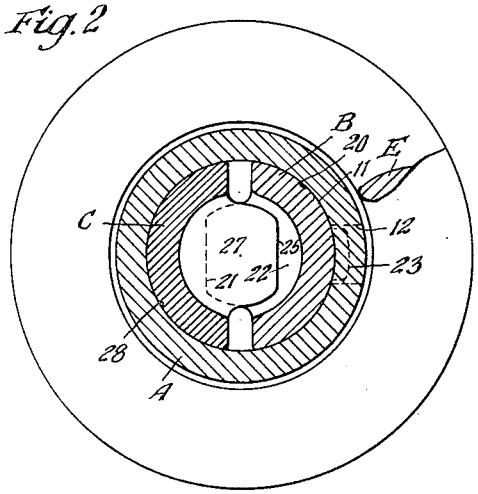
Inventor
Stacy B. Haseltine
By Henry Fuchs.
Atty.

June 26, 1945.  S. B. HASELTINE  2,379,078
FRICTION SHOCK ABSORBER
Filed Dec. 22, 1943  2 Sheets-Sheet 2

Inventor
Stacy B. Haseltine
By Henry Fuchs.
Atty.

Patented June 26, 1945

2,379,078

UNITED STATES PATENT OFFICE 2,379,078

FRICTION SHOCK ABSORBER

Stacy B. Haseltine, La Grange, Ill., assignor to W. H. Miner, Inc., Chicago, Ill., a corporation of Delaware Application December 22, 1943, Serial No. 515,213

11 Claims. (Cl. 267—9)

This invention relates to improvements in friction shock absorbers, especially adapted for use as snubbing devices in connection with springs of railway car trucks.

One object of the invention is to provide a friction shock absorber of the character indicated, comprising a friction casing; a friction clutch slidable within the casing comprising friction shoes having interengaging wedge faces and spring means reacting between the shoes to effect wedging action on the wedge faces thereof to force the shoes apart, thereby expanding the clutch against the interior walls of the casing to provide uniformly constant frictional resistance to relative movement of the casing and shoes; and a spring surrounding the casing and shoes and yieldingly opposing relative lengthwise movement thereof.

Other objects of the invention will more clearly appear from the description and claims hereinafter following.

Figure 4:
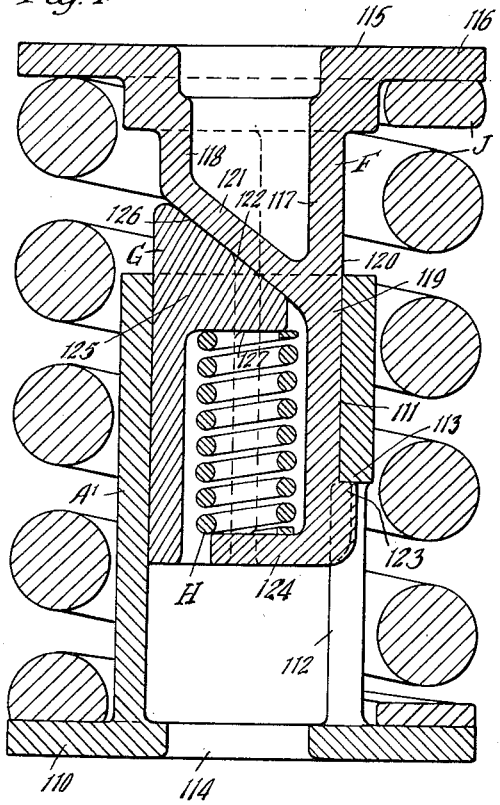
Figure 5:
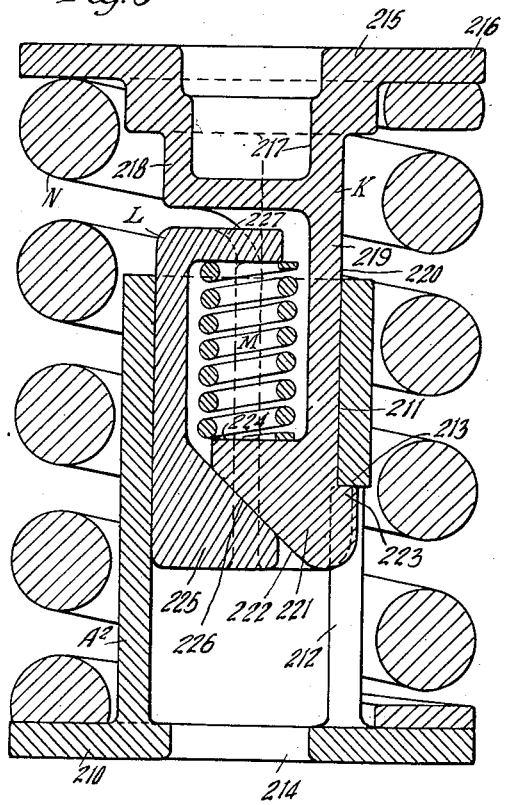

In the drawings forming a part of this specification, Figure 1 is a central, longitudinal, vertical sectional view of my improved shock absorber. Figure 2 is a transverse, horizontal sectional view, corresponding substantially to the line 2—2 of Figure 1. Figure 3 is a top plan view of Figure 1. Figure 4 is a view, similar to Figure 1, illustrating another embodiment of the invention. Figure 5 is a view, similar to Figure 1, illustrating still another embodiment of the invention.

Referring first to the embodiment of the invention illustrated in Figures 1, 2, and 3, my improved shock absorber comprises broadly a friction casing A; two friction shoes B and C having wedging engagement with each other; a relatively light spring D reacting between the shoes; and a heavy spring E opposing relative movement of the casing and shoes.

The casing A is in the form of a cylindrical, tubular member having a laterally outwardly projecting base flange 10 at its lower end forming, in effect, a follower member. The casing A is open at the top and is provided with an interior, cylindrical friction surface 11 at said open end. At opposed interior sides of the casing, the friction surface 11 presents, in effect, two separate friction face portions with which the shoes B and C respectively cooperate. The side wall of the casing is vertically slotted at the right hand side, as seen in Figure 1, thereby providing a guide slot 12 adapted to accommodate a stop lug on the shoe B, as hereinafter pointed out. The slot 12 extends upwardly from the base portion of the casing A to a point inwardly of the top end of the casing, the upper end wall of the slot forming a stop shoulder 13 for a purpose hereinafter pointed out.

The bottom wall of the casing A is provided with an opening 14 adapted to receive the usual spring centering projection of the lower spring follower plate of the spring cluster of a railway car truck.

The friction shoe B comprises a disclike follower member 15 having an annular peripheral flange 16 of lesser thickness than the central main body portion of the follower, and a postlike member 17 depending centrally from the follower member 15 and forming the friction shoe proper. The post 17 includes an upper cylindrical tube section 18 and an elongated, lower, transversely curved platelike section 19 which presents an outer, transversely curved friction surface 20 of cylindrical contour. The platelike section 19 extends into the casing A with the friction surface 20 thereof slidably engaging the interior friction surface 11 of the casing. Adjacent the lower end thereof the plate section 19 is provided with an inward enlargement 21 forming a wedge projection having an upwardly facing inner wedge face 22 thereon. At the outer side, at the lower end thereof, the platelike section 19 has a laterally, outwardly projecting lug 23 slidable in the slot 12 and engaging underneath the stop shoulder 13 to limit upward movement of the shoe. The upper end of the cylindrical tubelike section 18 is closed by a transverse abutment wall 24 which forms a seat for the spring D.

The friction shoe C is in the form of a heavy, transversely curved plate having an inward enlargement 25 adjacent the lower end thereof, forming a wedge projection. The enlargement 25 has a downwardly facing, inner wedge face 26 at the lower side thereof, correspondingly inclined to and engaging the wedge face 22 of the shoe B. At the upper side, the enlargement 25 presents a flat, transverse abutment face 27 forming a seat for the lower end of the spring D. At the outer side, the shoe C is provided with a lengthwise extending, transversely curved, cylindrical friction surface 28 slidably engaging the interior friction surface 11 of the casing A.

The spring resistance D is in the form of a single, relatively light coil. The spring D is disposed between the shoes B and C and has its upper and lower ends bearing respectively on the abutment wall 24 of the shoe B and the abutment face 27 of the enlargement 25 of the shoe C.

The spring D is under a predetermined initial compression and forces the wedge face 26 of the shoe C against the wedge face 22 of the shoe B, thereby spreading the shoes apart to place the friction surfaces thereof in tight frictional contact with the interior friction surface 11 of the casing.

The spring resistance E comprises a relatively heavy coil surrounding the casing A and shoes B and C and has its top and bottom ends bearing respectively on the flange 16 of the follower member 15 of the shoe B and the flange 10 of the casing A. In the assembled condition of the device, the spring D is preferably under initial compression.

As shown in Figure 1, the follower member 15 is provided with an upwardly opening recess 29 forming a seat adapted to receive the usual spring centering projection of an upper spring follower plate of a cluster of truck springs.

In assembling the mechanism, the spring E is first placed around the casing A with its lower end resting on the flange 10 thereof. This spring D is then inserted within the shoe B, being seated in the pocket formed by the tubular section 18 and the platelike section 19. The shoe C is next placed in the position shown in Figure 1, by forcing the wedge projection thereof between the lower end of the spring D and the wedge projection 21 of the shoe B. The unit or friction clutch comprising the shoe B, shoe C, and spring D is then assembled with the cylinder A by inserting the lower ends of the shoes within the open upper end of the casing, the lower end of the clutch being held slightly contracted, by a suitable tool during this operation of entering the same within the open upper end of the casing.

As will be seen upon reference to Figure 1, the lower end of the lug 23 of the shoe B is rounded off at the outer side to present a cam face 30 which facilitates assembly of the mechanism by camming engagement with the interior of the casing as the shoe is forced downwardly.

The clutch comprising the shoes B and C and the spring D is forced downwardly against the resistance of the spring E until the lug 23 of the shoe B passes beyond the shoulder 13 of the casing and snaps under the same to anchor the shoe B to the casing.

My improved shock absorber is substituted for one or more of the coil spring units of a cluster of truck springs, the same being interposed between the top and bottom spring follower plates of said cluster.

The operation of the improved shock absorber is as follows: Upon the spring cluster of the truck of the railway car being compressed between the spring follower plates of the cluster, the clutch comprising the shoes B and C, and the friction casing A are moved in lengthwise direction toward each other, thereby compressing the spring E and sliding the clutch inwardly along the friction surface of the casing, thus providing the required frictional resistance, which is substantially constant, to snub the action of the coils of the truck spring cluster. During recoil of the truck springs, expansion of the spring E returns all of the parts to the normal position shown in Figure 1, outward movement of the shoes being limited by shouldered engagement of the lug of the shoe B with the stop shoulder of the casing A.

As will be evident, the frictional resistance provided between the shoes and the casing being constant during all phases of the operation of my improved friction shock absorber, the same amount of frictional resistance to snub the action of the truck springs is provided during both compression and recoil of the truck springs.

Referring next to the embodiment of the invention illustrated in Figure 4, my improved shock absorber comprises a friction casing $A^1$ identical with the friction casing A hereinbefore described; two friction shoes F and G; a relatively light spring H; and a heavy spring J.

The friction casing $A^1$ has a base flange 110, corresponding the base flange 10 of the casing A, an interior friction surface 111, corresponding to the friction surface 11, a guide slot 112 and stop shoulder 113, corresponding to the slot 12 and shoulder 13; and an opening 114, corresponding to the opening 14 for receiving the spring centering projection of the bottom follower plate of the truck spring cluster.

The friction shoe F comprises a follower member 115 having an annular flange 116 and a post 117 depending centrally from the follower, the post having a hollow upper section 118 and a transversely curved, platelike lower section 119 forming the friction shoe member proper. The platelike section 119 presents a transversely curved outer friction surface 120 which has sliding engagement with the friction surface 111 of the casing. At the lower end, the platelike section 119 has a laterally projecting lug 123 cooperating with the stop shoulder 113 of the casing. At the lower end, the platelike section 1,9 has a transverse abutment wall 124 forming a seat for the lower end of the spring H. The hollow upper section 118 of the post member 117 is closed at the lower end thereof by an inclined transverse wall 121 presenting a downwardly facing inner wedge face 122.

The friction shoe G is in the form of a transversely curved, heavy, platelike member having a lateral inward enlargement 125 at the upper end thereof provided with an upwardly facing inner wedge face 126 at the upper side thereof, correspondingly inclined to and engaging with the wedge face 122 of the shoe F. At the lower side, the enlargement 125 presents a substantially flat, transverse abutment face 127 forming a seat for the upper end of the spring H.

The spring H is interposed between the abutment wall 124 of the shoe F and the abutment face 127 of the shoe G and is under initial compression and operates in the same manner as the spring D hereinbefore described.

The spring J is identical with the spring E hereinbefore described and operates in the same manner.

The device shown in Figure 4 is assembled in the same manner as the shock absorber shown in Figures 1, 2, and 3 and it operates in a similar manner.

Referring next to the embodiment of the invention illustrated in Figure 5, my improved shock absorber comprises a friction casing $A^2$ identical with the friction casing A hereinbefore described; two friction shoes K and L; a relatively light spring M; and a heavy spring N.

The friction casing $A^2$ has a base flange 210 corresponding to the base flange 10 of the casing A; an interior friction surface 211 corresponding to the friction surface 11; a guide slot 212 and stop shoulder 213 corresponding to the slot 12 and shoulder 13; and an opening 214 corresponding to the opening 14 for accommodating the spring centering projection of the bottom follower plate of the truck spring cluster.

The friction shoe K comprises a follower member 215 having an annular flange 216 and a post 217 depending centrally from the follower, the post having a hollow upper section 218 and a transversely curved, platelike, lower section 219. The platelike section, which forms the friction shoe proper, presents an outer, transversely curved, longitudinally extending friction surface 220 which has sliding engagement with the friction surface 211 of the casing. At the lower end, the plate section 219 has an inward enlargement 221 presenting a downwardly facing, inner wedge face 222 at its lower side. A stop lug 223, which projects laterally outwardly from the lower end portion of the section 219, cooperates with the stop shoulder 213 of the casing. The enlargement 221 of the shoe K presents a flat, transverse, abutment face 224 at the upper side thereof forming a seat for the lower end of the spring M.

The friction shoe L is in the form of a transversely curved, heavy, platelike member having a lateral inward enlargement 225 at the lower end thereof provided with an upwardly facing inner wedge face 226 at the upper side thereof, correspondingly inclined to and engaging with the wedge face 222 of the shoe K. At the upper end, the shoe L has a transverse abutment wall 227 forming a seat for the upper end of the spring M.

The spring M is interposed between the abutment face 224 of the shoe K and the abutment wall 227 of the shoe L and is under initial compression and operates in the same manner as the spring D hereinbefore described.

The spring N is identical with the spring E hereinbefore described and operates in the same manner.

The device shown in Figure 5 is assembled in substantially the same manner as the devices hereinbefore described and its operation is also the same.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a friction casing; of a pair of friction shoes slidingly telescoped within the casing, said shoes having interengaging wedge faces, one of said shoes having a follower section rigid therewith and exterior to the casing; a spring reacting between said follower section and the other shoe for forcing the latter against the former; and a second spring reacting between said casing and follower section and opposing relative movement toward each other of said casing and follower section.

2. In a friction shock absorber, the combination with a friction casing; of a pair of friction shoes slidingly telescoped within the casing, one of said shoes having a post portion extending outwardly of the casing; a follower integral with said post portion; a spring reacting between said follower and other shoe for forcing the shoes together, said shoes having cooperating wedge faces; and a second spring opposing relative lengthwise movement toward each other of the casing and follower said spring bearing on said follower.

3. In a friction shock absorber, the combination with an upper follower; of a lower friction casing; a depending friction shoe member rigid with said follower and having sliding engagement with the interior of the casing, said shoe member having an upwardly facing wedge face at its lower end; a second shoe member having sliding frictional engagement with the interior of the casing, said second shoe member having a wedge face at its lower side engaged with the wedge face of said first named shoe; a spring reacting between said follower and second named shoe member for forcing the second named shoe member against the first named shoe member; and a second spring bearing on said follower and casing and opposing relative movement of said follower and casing toward each other.

4. In a friction shock absorber, the combination with an upper follower; of a lower friction casing; a depending friction shoe member rigid with said follower and having sliding engagement with the interior of the casing, said shoe member having a lateral wedge projection on the inner side at the lower end thereof; a second shoe member having sliding frictional engagement with the interior of the casing, said second shoe member having a lateral wedge projection on the inner side at the lower end thereof in wedging engagement with the wedge projection of said first named shoe member; a spring reacting between said follower and second named shoe member for forcing the wedge projection of the latter against the wedge projection of said first named shoe member; and a second spring bearing on said follower and casing and opposing relative movement of said follower and casing toward each other.

5. In a friction shock absorber, the combination with an upper follower; of a lower friction casing; a depending friction shoe member rigid with said follower and having sliding engagement with the interior of the casing, said shoe member having a downwardly facing wedge face at its upper end; a second shoe member having sliding frictional engagement with the interior of the casing, said second shoe member having a wedge face at its upper end engaged with the wedge face of said first named shoe; a spring reacting between said first and second named shoe members for forcing the second named shoe member against the first named shoe member; and a second spring bearing on said follower and casing and opposing relative movement of said follower and casing toward each other.

6. In a friction shock absorber, the combination with an upper follower; of a lower friction casing; a depending friction shoe member rigid with said follower and having sliding engagement with the interior of the casing, said shoe member having a lateral wedge projection on the inner side at the upper end thereof; a second shoe member having sliding frictional engagement with the interior of the casing, said second shoe member having a lateral wedge projection on the inner side at the upper end thereof in wedging engagement with the wedge projection of said first named shoe member; a spring reacting between said first and second named shoe members for forcing the wedge projection of the latter against the wedge projection of said first named shoe member; and a second spring bearing on said follower and casing and opposing relative movement of said follower and casing toward each other.

7. In a friction shock absorber, the combination with an upper follower; of a lower friction casing; a depending friction shoe member rigid with said follower and having sliding engagement with the interior of the casing, said shoe member having a downwardly facing wedge face at its lower end; a second shoe member having sliding frictional engagement with the interior of the casing, said second shoe member having a wedge face at its lower side engaged with the wedge face of said first named shoe; a spring reacting between said first and second named shoe members for forcing the second named shoe member against the first named shoe member; and a second spring opposing relative movement of said follower and casing toward each other.

8. In a friction shock absorber, the combination with an upper follower; of a lower friction casing; a depending friction shoe member rigid with said follower and having sliding engagement with the interior of the casing, said shoe member having a lateral wedge projection on the inner side at the lower end thereof; a second shoe member having sliding frictional engagement with the interior of the casing, said second shoe member having a lateral wedge projection on the inner side at the lower end thereof in wedging engagement with the wedge projection of said first named shoe member; a spring reacting between said first and second named shoe members for forcing the wedge projection of the latter against the wedge projection of said first named shoe member; and a second spring bearing on said follower and casing and opposing relative movement of said follower and casing toward each other.

9. In a friction shock absorber, the combination with a friction casing; of a pair of friction shoes telescoped within the casing, said shoes having interengaging wedge faces, one of said shoes having a follower section exterior to the casing integral with said shoe, said last named shoe having shouldered engagement with the casing to limit outward movement of said shoe; a spring reacting between said follower section and the other shoe for forcing the latter against the former; and a second spring bearing on said follower section and casing and opposing relative movement of the follower section and casing toward each other.

10. In a friction shock absorber, the combination with a friction casing having a base flange; of a pair of friction shoes slidingly telescoped within the casing, one of said shoes having a post portion rigid therewith extending outwardly of the casing; a follower integral with said post portion; a spring interposed between said follower and other shoe and bearing on said follower and last named shoe for forcing the shoes together, said shoes having cooperating wedge faces; and a second spring surrounding said casing and having its opposite ends bearing on said base flange and follower for opposing relative movement of said casing and follower toward each other.

11. In a friction shock absorber, the combination with a friction casing; of a follower movable toward and away from said casing, said follower including a friction shoe member rigid therewith; a friction shoe, said friction shoe member and shoe being telescoped within the casing and having sliding engagement with the walls thereof, said shoe member and shoe having wedging engagement with each other; spring means reacting between said shoe and said follower for forcing the shoe and shoe member into wedging engagement with each other; and a spring bearing on said follower and casing and opposing relative movement toward each other of said follower and casing.

STACY B. HASELTINE.